US008747931B2

(12) United States Patent
DeLine et al.

(10) Patent No.: US 8,747,931 B2
(45) Date of Patent: Jun. 10, 2014

(54) SUPER CRITICAL FLUID EXTRACTION AND FRACTIONATION OF BRAN EXTRACTION MATERIALS

(75) Inventors: Kenneth E. DeLine, Avon, CO (US); Daniel L. Claycamp, West Frankfort, IL (US); Daniel Fetherston, Cape Girardeau, MO (US); Rodger T. Marentis, Macungie, PA (US)

(73) Assignee: MOR Supercritical, LLC, Macungie, PA (US)

( * ) Notice: Subject to any disclaimer, the term of this patent is extended or adjusted under 35 U.S.C. 154(b) by 450 days.

(21) Appl. No.: 12/288,960

(22) Filed: Oct. 24, 2008

(65) Prior Publication Data

US 2009/0110792 A1    Apr. 30, 2009

Related U.S. Application Data

(60) Provisional application No. 61/000,211, filed on Oct. 24, 2007.

(51) Int. Cl.
*A23D 9/04*    (2006.01)
*A23L 1/10*    (2006.01)

(52) U.S. Cl.
CPC ................. *A23D 9/04* (2013.01); *A23L 1/1016* (2013.01)
USPC ........................... 426/430; 426/601; 426/417

(58) Field of Classification Search
CPC ........... A23D 9/04; A23D 9/02; A23D 9/007; A23D 9/10; A23L 1/1016; A23L 1/2112
USPC .......................................... 426/430, 601, 417
See application file for complete search history.

(56) References Cited

U.S. PATENT DOCUMENTS

| 4,018,755 | A | 4/1977 | Wang |
| 4,059,604 | A | 11/1977 | Kresse |
| 4,083,836 | A | 4/1978 | Anjou et al. |
| 4,325,882 | A | 4/1982 | Reiners |
| 4,341,713 | A | 7/1982 | Stolp et al. |
| 4,466,923 | A | 8/1984 | Friedrich |
| 4,495,207 | A | 1/1985 | Christianson et al. |
| 4,515,726 | A | 5/1985 | Sullivan |

(Continued)

FOREIGN PATENT DOCUMENTS

| CN | 1242416 | 1/2000 |
| CN | 1522596 | 8/2004 |

(Continued)

OTHER PUBLICATIONS

Caude, Marcel II and Didier Thiebaut, Practical Supercritical Fluid Chromography and Extraction. 1999. Overseas Publishers Association. pp. 314.*

(Continued)

*Primary Examiner* — Lien T. Tran
*Assistant Examiner* — Hong T Yoo
(74) *Attorney, Agent, or Firm* — Craig R. Miles; CR Miles P.C.

(57) ABSTRACT

Generally, a bran processing system for the supercritical carbon dioxide extraction of bran extraction material from bran and fractionation of the bran extraction material. Specifically, a bran processing system for the isolation of a bran extraction material fraction enriched in ferulate-phytosterol esters or oryzanol.

20 Claims, 8 Drawing Sheets

(56) References Cited

U.S. PATENT DOCUMENTS

| | | | |
|---|---|---|---|
| 4,576,820 | A | 3/1986 | Hussmann |
| 4,675,133 | A | 6/1987 | Eggers et al. |
| 4,744,926 | A | 5/1988 | Rice |
| 4,859,371 | A | 8/1989 | Diosady et al. |
| 4,898,673 | A | 2/1990 | Rice et al. |
| 4,994,272 | A | 2/1991 | Hussmann |
| 4,996,072 | A | 2/1991 | Marschner et al. |
| 5,097,012 | A | 3/1992 | Thies et al. |
| 5,120,558 | A | 6/1992 | Nguyen et al. |
| 5,138,075 | A | 8/1992 | Ohgaki et al. |
| 5,252,729 | A | 10/1993 | De Crosta et al. |
| 5,498,384 | A | 3/1996 | Volk et al. |
| 5,680,812 | A | 10/1997 | Linsgeseder |
| 5,685,218 | A | 11/1997 | Kemper |
| 5,759,549 | A | 6/1998 | Hiltunen et al. |
| 5,826,500 | A | 10/1998 | Kemper |
| 5,932,101 | A | 8/1999 | Kanel et al. |
| 5,932,261 | A | 8/1999 | Unnithan |
| 5,997,877 | A | 12/1999 | Chang |
| 6,177,114 | B1 | 1/2001 | Unnithan |
| 6,201,142 | B1 | 3/2001 | Maza |
| 6,248,910 | B1 * | 6/2001 | Franke ............................ 554/12 |
| 6,326,035 | B1 | 12/2001 | Nakatani et al. |
| 6,495,175 | B2 | 12/2002 | Rao et al. |
| 6,504,085 | B1 | 1/2003 | Howard |
| 6,570,030 | B2 | 5/2003 | Goto et al. |
| 6,610,867 | B2 | 8/2003 | Jakel et al. |
| 6,664,405 | B2 | 12/2003 | Lee |
| 6,800,316 | B1 | 10/2004 | Perrut et al. |
| 6,814,998 | B1 | 11/2004 | Ozawa et al. |
| 6,936,110 | B2 | 8/2005 | Van Thorre |
| 7,037,548 | B2 | 5/2006 | Ozawa et al. |
| 7,074,449 | B1 | 7/2006 | Holley et al. |
| 7,083,954 | B2 | 8/2006 | Jakel et al. |
| 7,087,720 | B2 | 8/2006 | Murray et al. |
| 7,494,675 | B2 | 2/2009 | Abbas et al. |
| 2002/0193617 | A1 | 12/2002 | Ulrich et al. |
| 2003/0019736 | A1 | 1/2003 | Garman |
| 2004/0234649 | A1 | 11/2004 | Lewis et al. |
| 2005/0233030 | A1 | 10/2005 | Lewis et al. |
| 2005/0239181 | A1 | 10/2005 | Lewis et al. |
| 2007/0009646 | A1 | 1/2007 | Ulrich et al. |
| 2007/0037267 | A1 | 2/2007 | Lewis et al. |

FOREIGN PATENT DOCUMENTS

| | | |
|---|---|---|
| GB | 366516 | 1/1932 |
| GB | 707385 | 4/1954 |
| GB | 1058076 | 2/1967 |
| GB | 1398459 | 6/1975 |
| JP | 6136384 | 5/1994 |
| JP | 6299187 | 10/1994 |
| MX | PA99000033 | 9/2004 |

OTHER PUBLICATIONS

IN 200401890, Andikkanuu et al. Derwent Abstract. Sep. 8, 2006.*
Kuk, M.S. and M.K. Dowd, Supercritical CO2 Extraction of Rice Bran, Journal of American Oil Chemists' Society, vol. 75, No. 5, 1998, pp. 623-628.*
Holcomb, Manuel, Harold C. Thompson Jr., Willie M. Cooper and Marvin L. Hopper. SFE Extraction of alfatoxins (B1, B2, G1, and G2) from corn and analysis by HPLC. The Journal of Supercritical Fluids, vol. 9 Issue 2, Jun. 1996, pp. 118-121.
Taylor, Scott L. Jerry W. King, and Gary R. List. Determination of Oil Content in Oilseeds by Analytical Supercritical Fluid Extraction. JAOCS, vol. 70 Issue 4, Apr. 1993, pp. 437-439.
G. Brunner. Gas Extraction—An Introduction to Fundamentals of Supercritical Fluid and the Application to Separation Processes, Springer, Berlin 1994, pp. 59-383.
Lira, C.T., Physical Chemistry of Supercritical Fluids, Supercritical Fluid Extraction and Chromatography Techniques and Applications, American Chemical Society, 1988, pp. 1-25.
U.S. Appl. No. 61/000,211, filed Oct. 24, 2007 entitled "Carbon Dioxide Extraction of Corn Bran Material From Corn Bran".
U.S. Appl. No. 12/217,497, filed Jul. 5, 2008, entitled "Pressure Regulated Supercritical Fluid Fractionation of Oil Seed Extraction Materials".
U.S. Appl. No. 60/958,472, filed Jul. 6, 2007 entitled "Corn Germ Extraction Material Production System".
U.S. Appl. No. 11/716,838, filed Mar. 12, 2007 entitled "Carbon Dioxide Extraction of Corn Germ Oil From Corn Germ".
Patent Cooperation Treaty Patent Application No. PCT/US2007/018169, filed Aug. 15, 2007 entitled "Carbon Dioxide Extraction of Corn Germ Oil From Corn Germ".
U.S. Appl. No. 60/838,642, filed Mar. 21, 2007 entitled "Kernel Fractionation Process".
U.S. Appl. No. 11/726,255, filed Aug. 18, 2006 entitled "Kernel Fractionation Process".
Patent Cooperation Treaty Patent Application No. PCT/US2007/016898, filed Jul. 27, 2007 entitled "Kernel Fractionation System".
Patent Cooperation Treaty Continuation-In-Part Patent Application No. PCT/US2008/003794, filed Mar. 21, 2008 entitled "Grain Fraction Extraction Material Production System".
U.S. Appl. No. 12/001,624, filed Dec. 12, 2007 entitled "Grain Fraction Extraction Material Production System".
U.S. Appl. No. 60/858,107, filed Nov. 10, 2006 entitled "Power Production Using Grain Fractionation Products".
Patent Cooperation Treaty Patent Application No. PCT/US2006/045193, filed Nov. 22, 2006 entitled "Power Production Using Grain Fractionation Products".
U.S. Appl. No. 11/792,149, filed Jun. 1, 2007 entitled "Power Production Using Grain Fractionation Products".
Taylor, Scott L. et al., Supercritical Fluid Extraction and Fractionation of Corn Bran Oil, Supercritical Fluids for Sustainable Technology, ISSF 2000, 2000, pp. 1-10.
E. Reverchon, G. Della Porta, D. Gorgoglione. Supercritical CO2 fractionation of jasmine concrete. J. Supercrit. Fluids 8 (1995) 60-65.
E. Reverchon, G. Della Porta. Rose concrete fractionation by supercritical CO2. J. Supercrit. Fluids 9 (1996) 199-204.
R. L. Smith Jr., R.M. Malaluan, W.B. Setianto, H. Inomata, K. Arai. Separation of cashew (*Anacardium occidentale* L.) nut shell liquid with supercritical carbon dioxide. Bioresource Technology 88 (2003) 1-7.
M. A. Rostagno, J.M.A. Araujo, D. Sandi. Supercritical fluid extraction of isoflavones from soybean flour, Food Chem. 78 (2002) 111-117.
L. Sesti Osseo, G. Caputo, I. Gracia, E. Reverchon. Continuous fraction of used frying oil by supercritical CO2. J. Am. Oil Chem. Soc. (JAOCS) 81 (9) (2004) 879-885.
Alberto Bertucco, Francesco Sanmartin and Giuseppe Storti. Simulated moving bed technology for continuous, countercurrent solid-fluid supercritical extraction. The Journal of Supercritical Fluids, vol. 8, Issue 2, Jun. 1995, 138-148.
H. Lee, B.H. Chung and Y. Park. Concentration of tocopherols from soybean sludge by supercritical carbon dioxide. *JAOCS* 68 (1991), p. 571-573.
G. Brunner, Th. Malchow, K. Stürken and Th. Gottschau. Separation of tocopherols from deodorizer condensates by countercurrent extraction with carbon dioxide. *J. Supercrit. Fluids* 4 (1991), p. 72-80.
J.A. Briones, J.C. Mullins and M.C. Thies. Solvent extraction of fatty acids from natural oils with liquid water at elevated temperatures and pressures. *JAOCS* 67 (1990), p. 852-857.
P. Bondioli, C. Mariani, A. Lanzani, E. Fedeli and A. Muller. Squalene recovery from olive oil deodorizer distillates. *JAOCS* 70 (1993), p. 763-766.
O.J. Catchpole and J.C. von Kamp. Extraction of squalene from shark liver oil in a packed column using supercritical $CO_2$. *Ind. Eng. Chem. Res.* 36 (1997), p. 4318-4324.
M.F. Mendes, F.L.P. Pessoa, G.V. Coelho, and A.M.C. Uller. Recovery of the high aggregated compounds present in the deodorizer distillate of vegetable oils using supercritical fluids. *JAOCS* 34:2, Jun. 2005, pp. 157-162.

(56) References Cited

OTHER PUBLICATIONS

D. D. Christianson, J. P. Friedrich, G. R. List, K. Warner, E. B. Bagley, A. C. Stringfellow, G. E. Inglett. Supercritical Fluid Extraction of Dry-Milled Corn Germ with Carbon Dioxide. Journal of Food Science 49 (1), 1984, 229-232.

B.M.C. Soares, F.M.C. Gamarra, L.C. Paviani, L.A.G. Goncalves, F.A. Cabral. Solubility of triacyclglycerols in supercritical carbon dioxide. J. Supercrit. Fluids. 2007, 6 total pages.

Ozlem Guclu-Ustundag, Feral Temelli. Correlating the solubility behavior of minor lipid components in supercritical carbon dioxide. J. of Supercritical Fluids 31 (2004) 235-253.

Helena Sovova, Marie Zarevucka, Miroslav Vacek, and Karel Stransky. Solubility of two vegetable oils in supercritical carbon dioxide. J. of Supercritical Fluids 20 (2001) pp. 15-28.

Masturah Markom, Harcharan Singh, and Masitah Hasan. Supercritical $CO_2$ fractionation of crude palm oil. J. of Supercritical Fluids 20 (2001) pp. 45-53.

Kleber, Mark, Mississippi Renewable Energy Conference—Mar. 25-26, 2003, mg engineering Lurgi PSI, Biodesel Capabilities, 2003, pp. 1-28.

Ronyai, E., B. Simandi, S. Tomoskozi, A. Deak, L. Vigh, and Zs. Weinbrenner. Supercritical fluid extraction of corn germ with carbon dioxide-ethyl alcohol mixture. The Journal of Supercritical Fluids, vol. 14 Issue 1, Oct. 1998, pp. 75-81.

Otles, Semih. Supercritical Fluids and Its Applications in Food Industry. http://eng.ege.edu.tr/~otles/SupercriticalFluids-ScienceAndTechnology/bolumb/Wc197588f62dd7.htm, printed Mar. 16, 2007.

* cited by examiner

SUPER CRITICAL FLUID EXTRACTION AND FRACTIONATION OF BRAN EXTRACTION MATERIALS

This United States Non-Provisional patent application claims the benefit of U.S. Provisional Patent Application No. 61/000,211, filed Oct. 24, 2007, hereby incorporated by reference herein.

I. BACKGROUND

Generally, a bran processing system for the supercritical carbon dioxide extraction of bran extraction material from bran and fractionation of the bran extraction material. Specifically, a bran processing system for the isolation of a bran extraction material fraction enriched in ferulate-phytosterol esters or oryzanol.

Fractionation of fractured grain such as corn into grain fractions of greater purity including a germ fraction, an endosperm fraction and a bran fraction has several advantages in the context of ethanol production. One advantage of generating grain fractions may be introduction of a greater amount of fermentable biomass into the ethanol production process over conventional methods which introduce whole milled grain. However, in ethanol production systems coupled to grain fractionation systems, the bran fraction may be separated away from the biomass fermented. The bran fraction which may be utilized separately or combined with distillation solids and condensed distillers soluble may be utilized as an animal feed.

A disadvantage of processing the bran fraction for use as animal feed can be that the commercial value of the bran fraction sold as animal feed has less value than the combined commercial value of the bran of the bran fraction utilized as fermentable biomass in the ethanol production process, or as an energy source, and the bran oil of the bran fraction sold directly as bran oil or as fractions of the bran oil for cooking or health supplements.

Additionally, a substantial disadvantage of conventional carbon dioxide extraction of the bran fraction to obtain unrefined bran extraction materials from corn bran or rice bran may not be sufficiently rapid for commercially feasible large scale extraction of the bran extraction material from the amounts of corn bran or rice bran produced by conventional corn and rice milling operations for ethanol production. For example, certain conventional methods of extracting bran extraction material from corn bran utilizes supercritical carbon dioxide at temperatures in the range of 40° C. and 80° C. and pressures between 13.8 and 69 MPa over a period of time of 120 minutes. Taylor, Scott L. and King, Jerry W., "*Supercritical Fluid Extraction and Fractionation of Corn Bran Oil*", National Center for Agricultural Utilization Research, Agricultural Research Services, United States Department of Agriculture. For commercial applications it may be more economically feasible when extraction of substantially all of the bran extraction material corn bran or rice bran occurs in a duration of 60 minutes or less.

Another substantial disadvantage of conventional methods of supercritical carbon dioxide extraction of corn bran or rice bran and the method of supercritical fractionation of the resulting corn bran extraction material and rice bran extraction material may be that the methods are conducted separate form one another as individual processes. For example, in a first step corn bran or rice bran can be extracted as above-described and the separated bran extraction material centrifuged to separate oil from waxes and other extract. The resulting oil is then stored until fractionated. One reason for the separate process can be that the fractionation process may not be compatible with the waxes and water resulting from the extraction procedure which may have to be removed from the bran oil prior to fractionation of the oil. Another reason that the extraction process and the fractionation process may remain separate is that conventional methods of supercritical carbon dioxide for fractionation purposes may further include ethanol or other solvents which preclude or make more difficult the recycling of the carbon dioxide from the fractionation process for use in supercritical carbon dioxide extraction of corn bran or rice bran.

The invention addresses each of these problems by providing embodiments of a process for the extraction and fractionation of bran extraction materials.

II. SUMMARY OF THE INVENTION

Accordingly, a broad object of the invention can be to provide a process for the supercritical carbon dioxide extraction of bran and fractionation of the resulting bran extraction materials.

A second broad object of the invention can be to provide a method of supercritical carbon dioxide extraction of bran having bran extraction conditions compatible with a method of bran extraction material fractionation having bran extraction material fractionation conditions which allow a single continuous process for the production of bran extraction material and the separation of substantially all of the ferulate-phytosterol esters in corn bran extraction material and substantially all of the oryzanol in rice bran extract materials from the unrefined bran extraction material in supercritical carbon dioxide.

A third broad object of the invention can be to provide a method of supercritical carbon dioxide extraction of bran extraction materials from corn bran and rice bran. The inventive supercritical carbon dioxide extraction conditions as to certain embodiments of the invention can extract greater amounts of bran extraction materials from the same amount of bran fraction compared with conventional bran oil extraction conditions or extract greater or similar amounts of bran extraction materials from corn bran or rice bran using lesser amounts of supercritical carbon dioxide or in a shorter period of time.

A fourth broad object of the invention can be to provide a bran extraction material fractionation assembly which receives bran extraction material in supercritical carbon dioxide directly from a bran fraction supercritical carbon dioxide extraction assembly which separates substantially all of the ferulate-phytosterol esters in corn bran extraction material and substantially all of the oryzanol in rice bran extract materials from the unrefined bran extraction material in supercritical carbon dioxide.

Naturally, further objects of the invention are disclosed throughout other areas of the specification, drawings, photographs, and claims.

III. A BRIEF DESCRIPTION OF THE DRAWINGS

Figure 2:
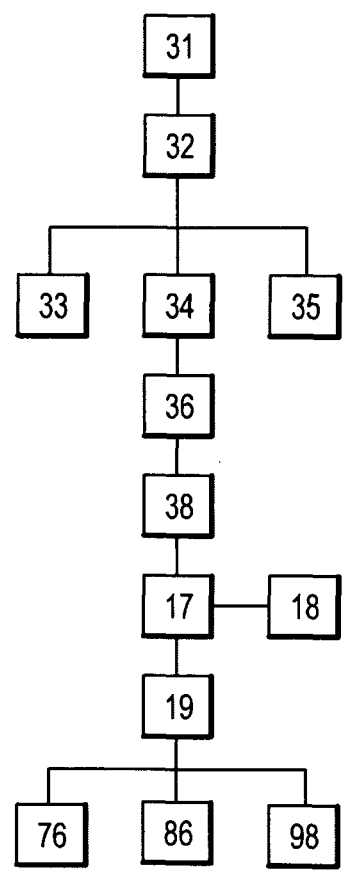
FIG. 2 is a flow diagram of a particular embodiment of the inventive grain milling and system which in part includes a rice bran extraction material system.
Figures 4, 4A:
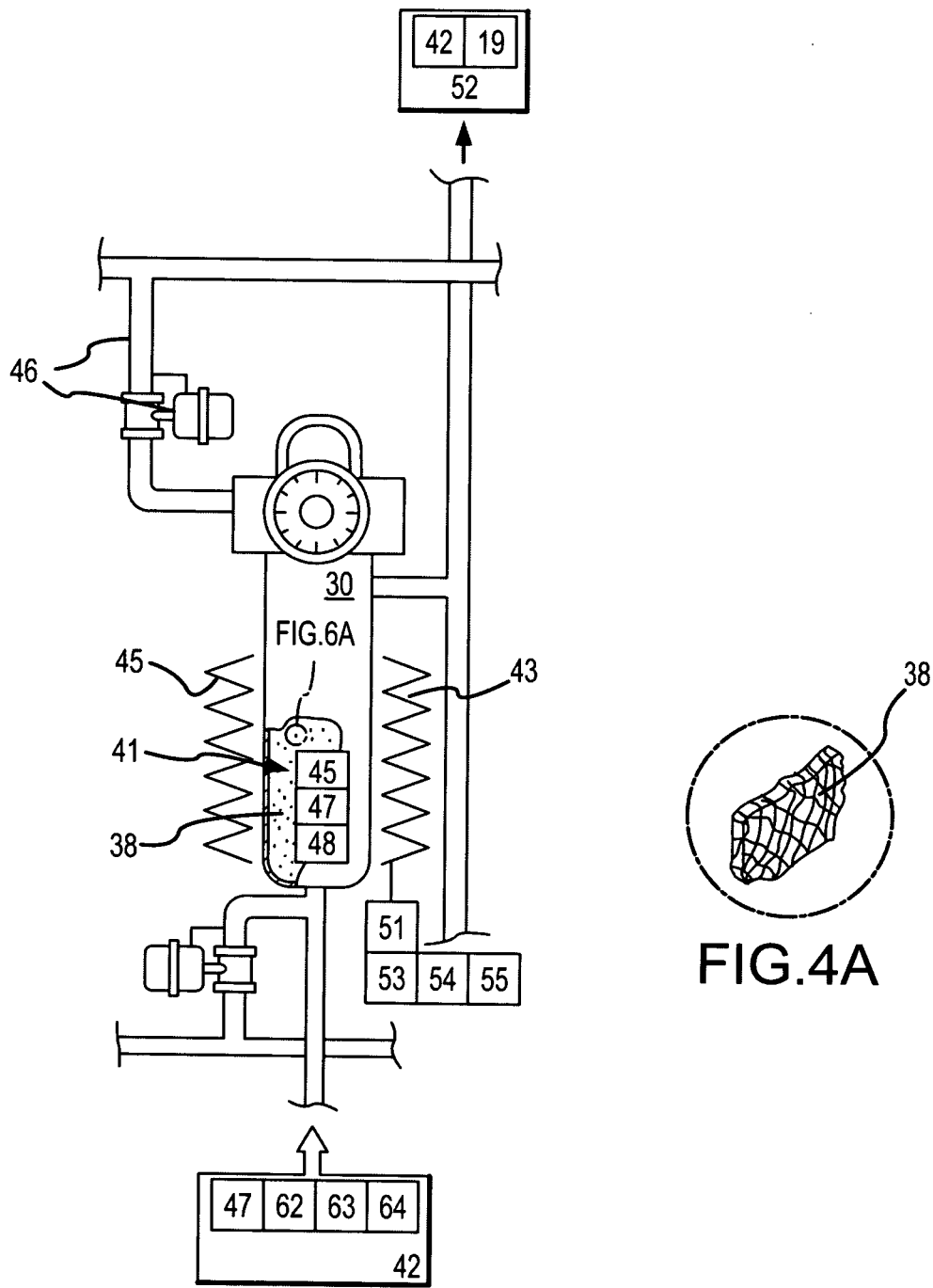

FIG. 4 provides an enlarged portion of the flow diagram shown in FIG. 2 further providing a cut away of a part of a bran extraction vessel showing a bran fraction extraction zone containing an amount of bran.

FIG. 4A provides an enlargement of a piece of the amount of bran in the bran extraction zone of the bran extraction vessel shown in FIG. 4.

Figure 5:
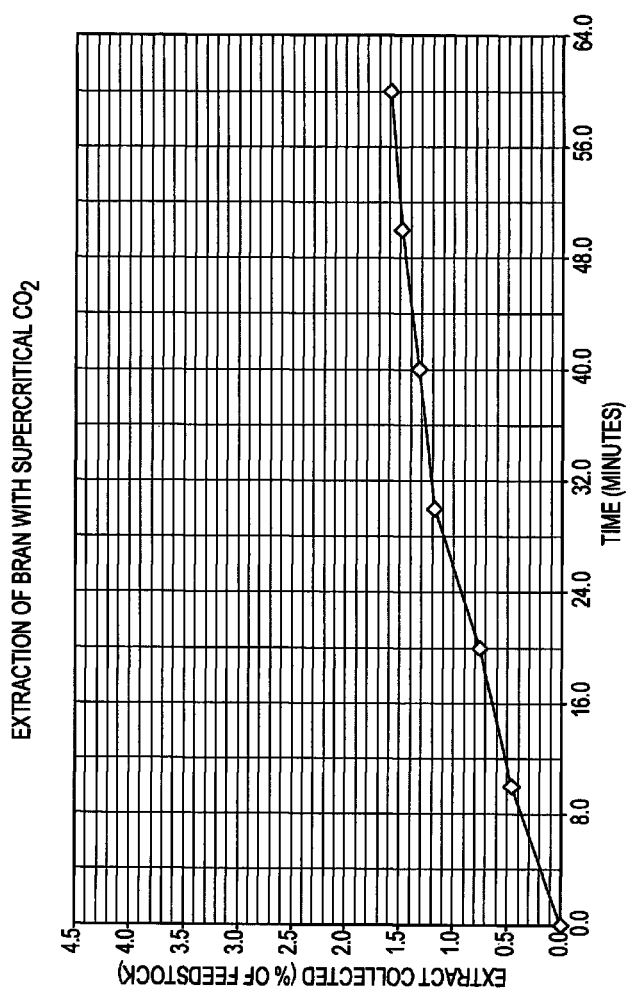

FIG. 5 is a graph which shows the amount of extraction material collected as function of elapsed time during supercritical carbon dioxide extraction of an amount of the bran fraction.

Figure 6:
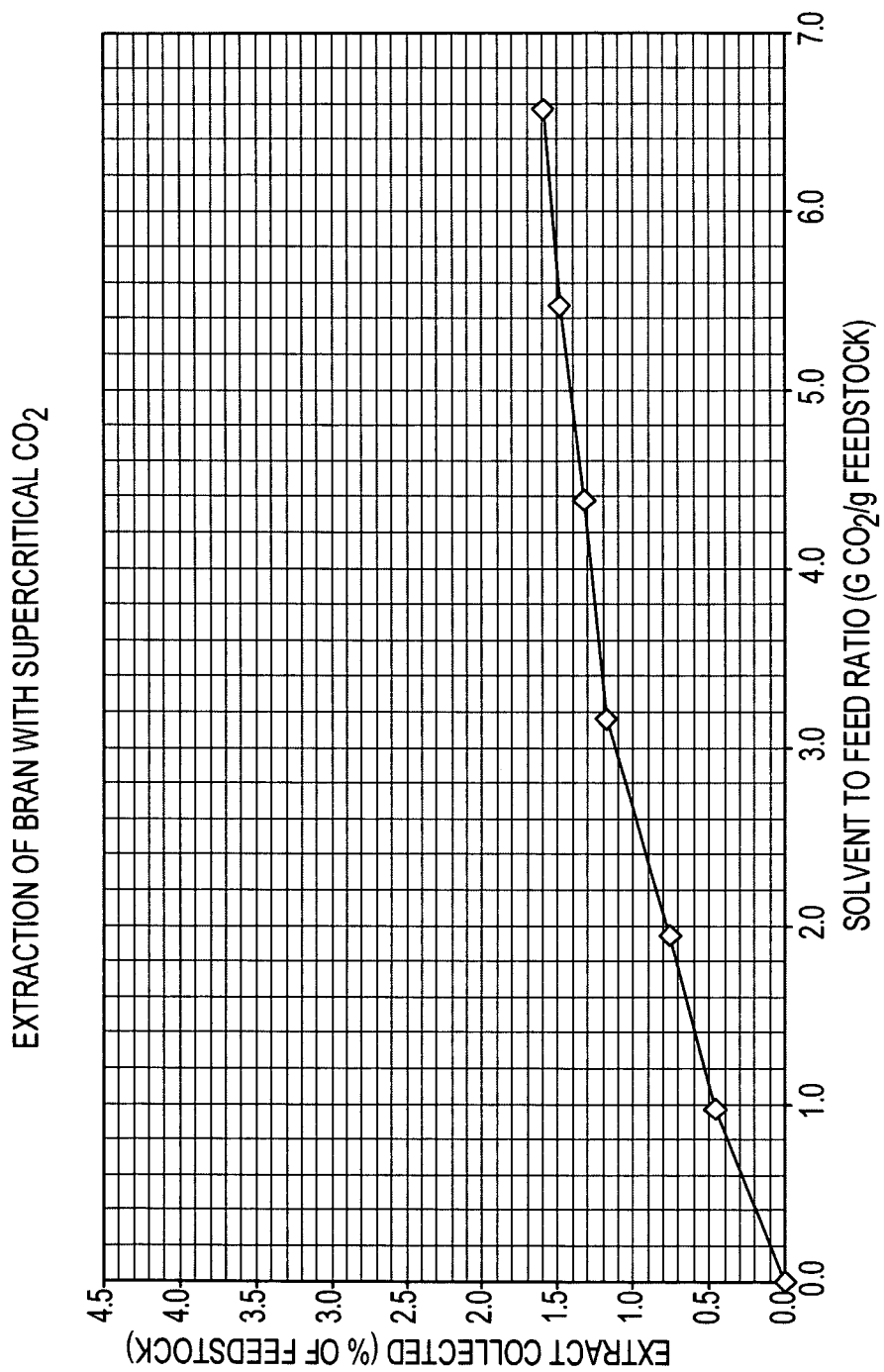

FIG. 6 is a graph which shows the amount of extraction material collected as a function of the solvent to feed ratio used during supercritical carbon dioxide extraction of an amount of the bran fraction.

Figure 3:
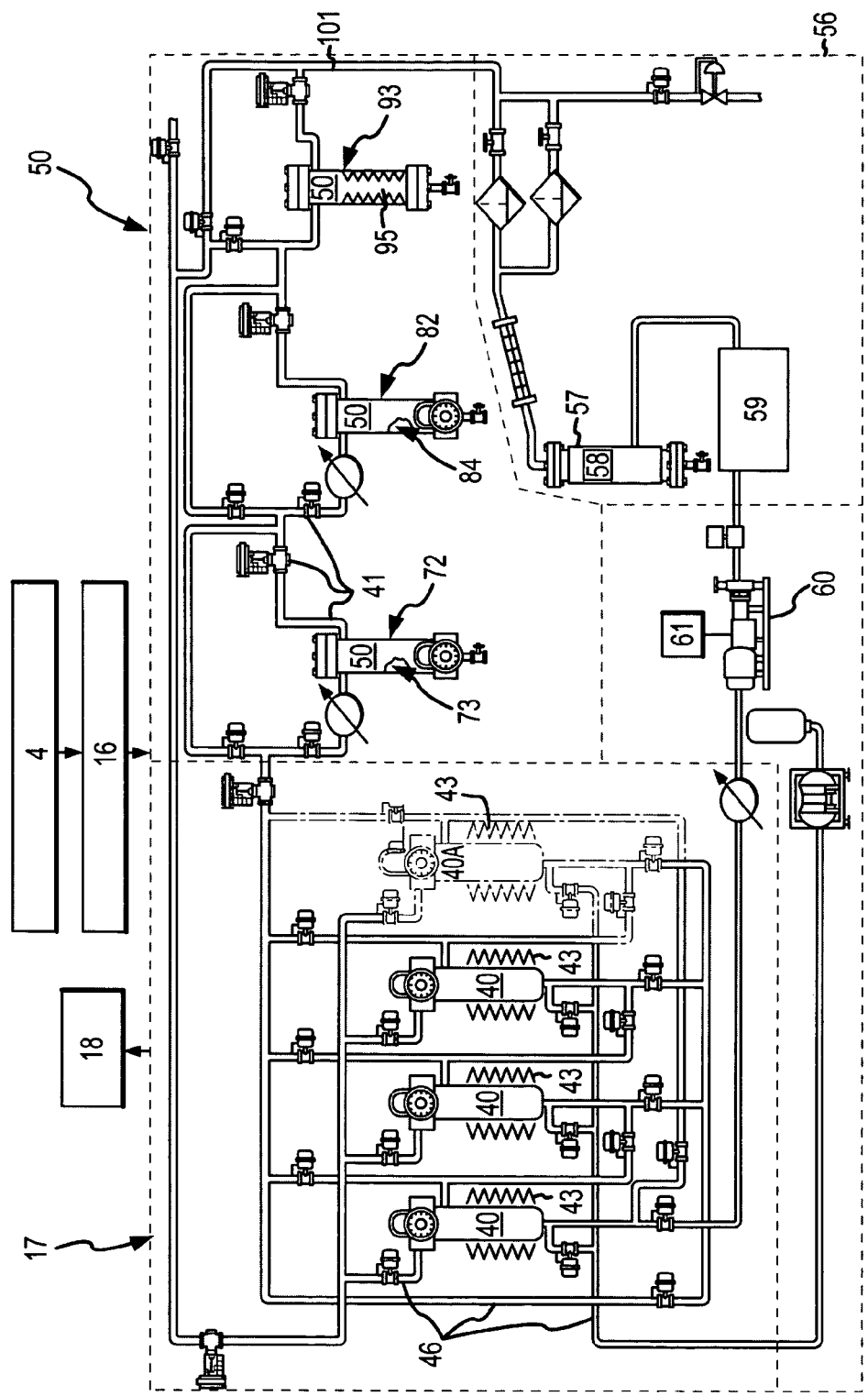
FIG. 3 is a flow diagram of a particular embodiment of a bran extraction and bran extraction material fractionation system.
Figure 7:
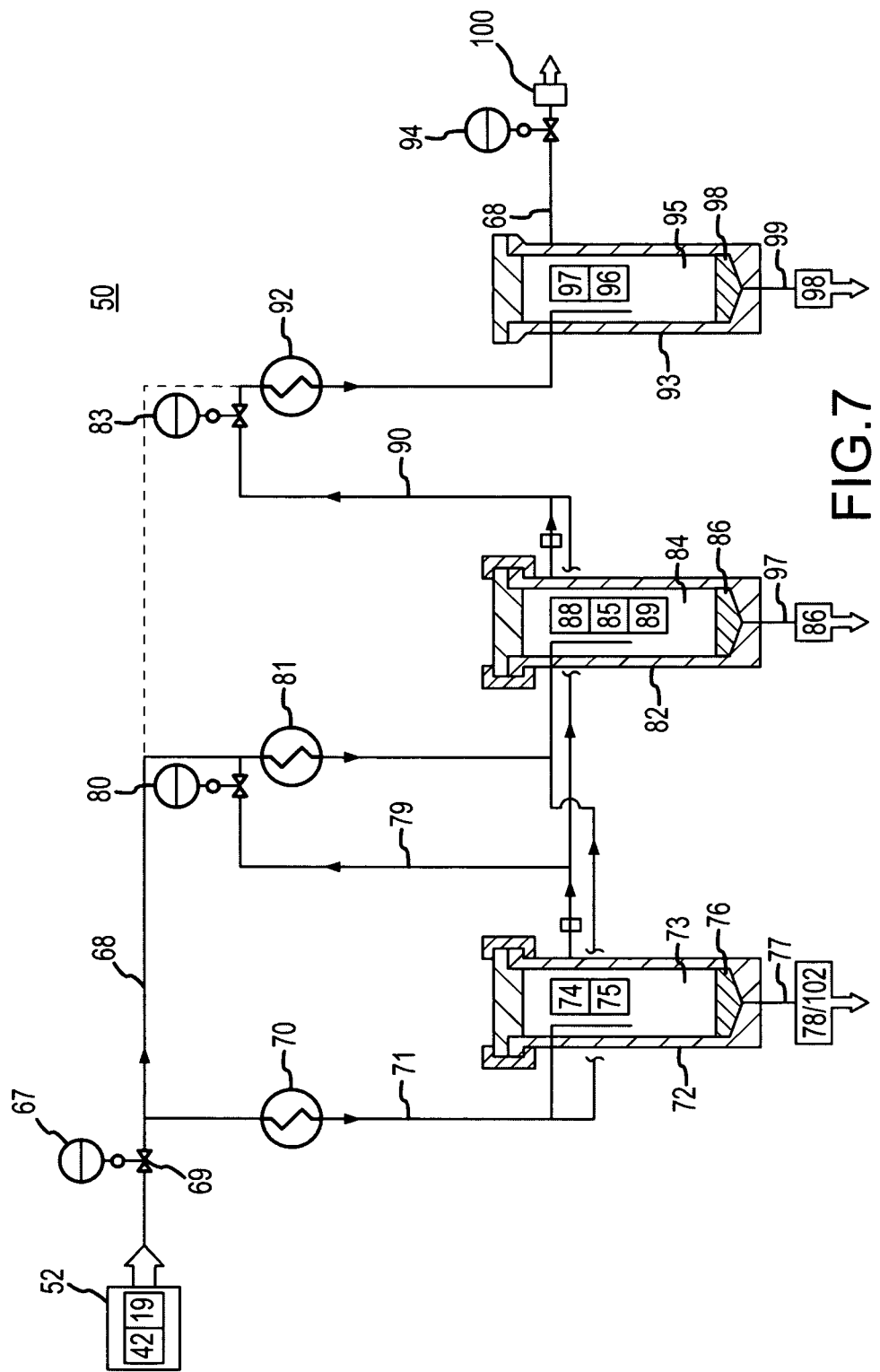

FIG. 7 provides an enlarged portion of the flow diagram shown in FIG. 3 further providing cut away views of the separator vessels included in the bran extraction material separator.

Figure 8:
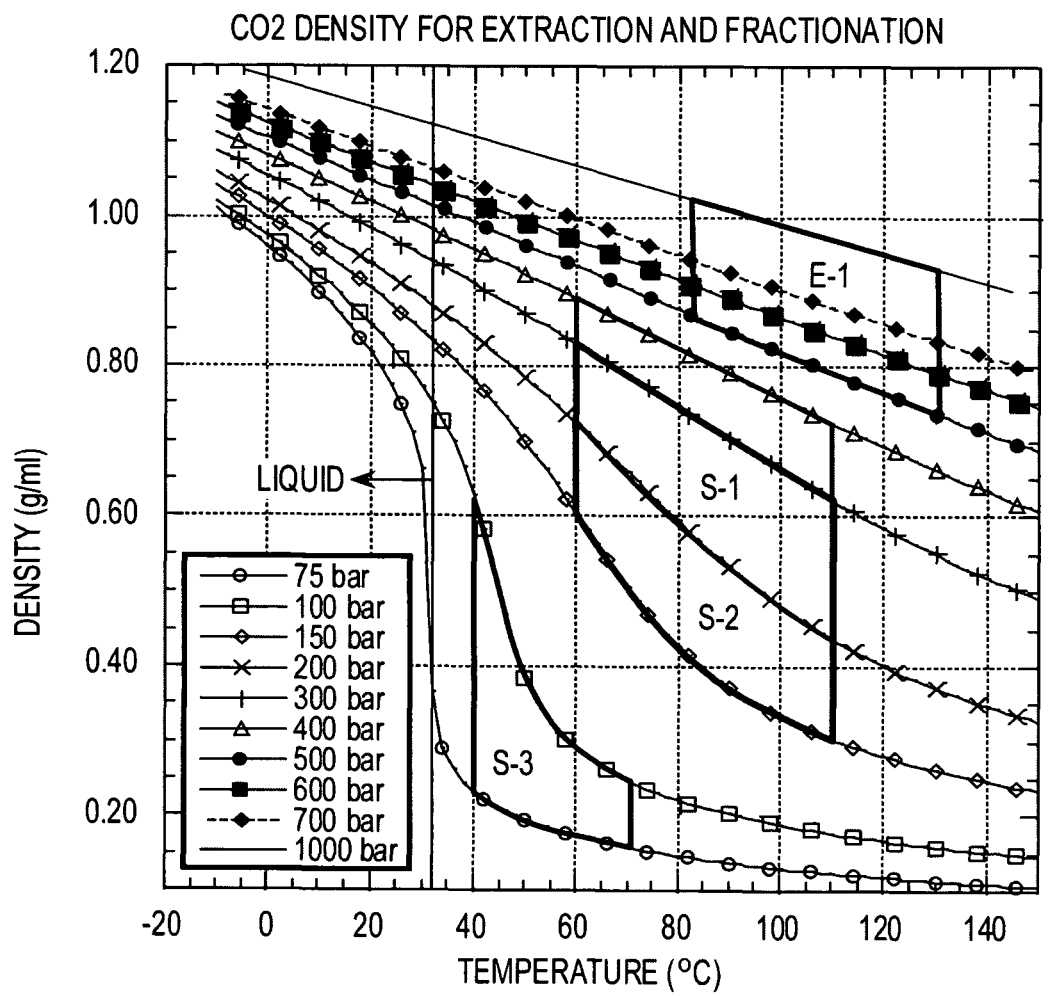

FIG. 8 provides a graph which plots density of supercritical carbon dioxide against temperature for each of a plurality of supercritical carbon dioxide pressures and provides for each extractor vessel (E-1) and for each of a first separator vessel (S-1), a second separator vessel (S-2), and a third separator vessel (S-3) a corresponding window which bounds the separation parameters in which one of a oryzanol fraction, a tryglyceride fraction, or a fatty acid fraction can be separated from an amount of supercritical carbon dioxide in which an amount of bran extraction material is established.

IV. DETAILED DESCRIPTION OF THE PREFERRED EMBODIMENTS

Generally, a bran processing system for the supercritical carbon dioxide extraction of bran extraction material from bran and fractionation of the bran extraction material. Specifically, a bran processing system for the isolation of a bran extraction material fraction enriched in ferulate-phytosterol esters or oryzanol.

Figure 1:
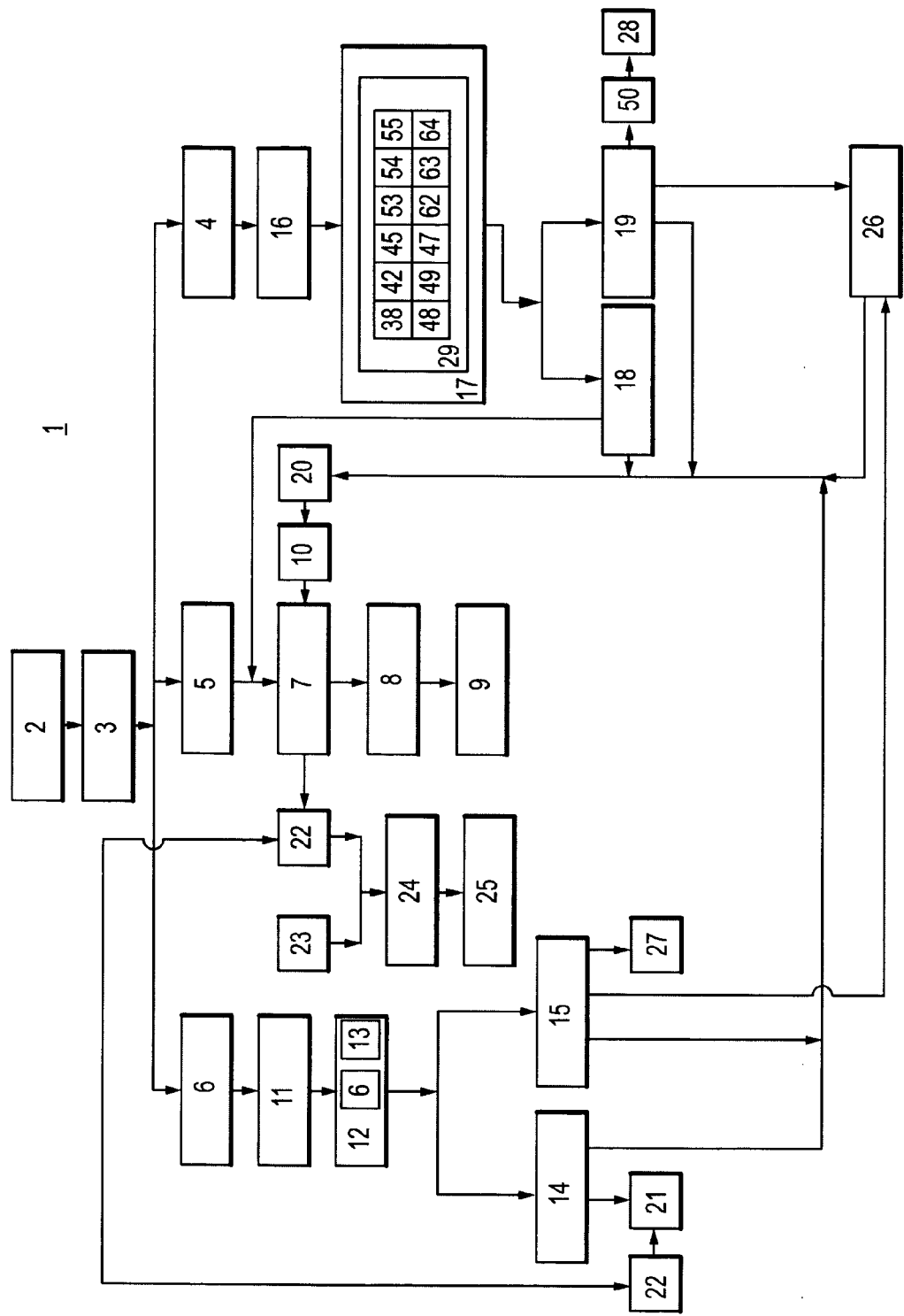
FIG. 1 is a flow diagram of a particular embodiment of the inventive grain milling and ethanol production system which in part includes a corn bran extraction material system.

Now referring primarily to FIG. 1, certain embodiments of the invention can include a grain milling process (1) to fracture whole grain (2) and introduce the fractured whole grain into a particle fractionation system (3). In the case of whole corn, fractured kernels of whole corn (2) can enter the particle fractionation system (3) which generates process fractions which include a corn pericarp fraction (also referred to as "bran fraction") (4), a corn endosperm fraction (5) and a corn germ fraction (6). As to certain embodiments of these grain milling processes (1), the isolated endosperm fraction (5) can be introduced into the ethanol production process (7) without substantial amounts of the germ fraction (6) or the bran fraction (4). By introducing only the corn endosperm fraction (5) into the ethanol production process (7) an increased amount of ethanol (8) and fuel ethanol (9) can be generated per unit of fermented material. As the amount of ethanol (8) per unit of fermented material increases, the amount of thermal energy (10) required to produce an amount of ethanol (5) decreases. The corn germ fraction (6) can be passed through a germ fraction comminutor (11) to reduce or make the particles of the corn germ fraction (6) consistent or compatible with a germ fraction supercritical carbon dioxide extraction system (12) including germ fraction supercritical carbon dioxide conditions (13) which can extract an amount the corn germ fraction (6) to produce an amount of corn germ cake (14) and an amount of corn germ extraction material (15). See for example, Patent Cooperation Treaty Application Nos. PCT/US2007/016898 and PCT/US2006/045193, each hereby incorporated by reference, for further description of a non-limiting example of a corn fractionation process and ethanol production process suitable for use with the invention.

As to certain embodiments of the invention, all or a part of the corn germ cake (14) or the corn germ extraction material (15), or both in various permutations and combinations can be introduced into a burner (20) and burned to generate all or a portion of the thermal energy (10) for the ethanol production process (7). That part of the corn germ cake (14) which is not burned in the burner (20) to produce thermal energy (10) can be utilized directly or mixed with an amount of condensed distiller solubles (22) as animal feed (21). Alternately, the condensed solubles (22) can be mixed with dried distillers grains (23) to produce dried distillers grains with solubles (24) which can be sold as animal feed (25). That part of the corn germ extraction material (15) that is not burned in the burner (20) can be converted to biodiesel (26) which can in whole or in part be burned in the burner (20) to produce thermal energy (10) or can be further refined and sold as refined corn oil (27).

Similarly, the corn bran fraction (4) can pass through a bran comminutor (16) to reduce or make the particles of the corn bran fraction (4) consistent or compatible with a bran fraction supercritical carbon dioxide extraction system (17) including bran fraction supercritical carbon dioxide conditions (29) which can extract an amount of corn bran fraction (38) to produce an amount of corn bran cake (18) and an amount of corn bran extraction material (19). The amount of corn bran cake (18) produced can in whole or in part be burned in the burner (20) to produce thermal energy (10) or can be introduced as fermentable material into the ethanol production process (7). Alternately, the corn bran extraction material (19) can be introduced into a bran extraction material fractionation assembly (50) and further refined as described below and sold as refined corn bran oil (28).

Now referring primarily to FIG. 2, certain embodiments of the invention provide a rice milling process (30) for whole grain rice (31) including a rice fractionation system (32) which generates process fractions including a rice husk fraction (33), a rice bran fraction (34) and a milled rice fraction (35). The rice bran fraction (34) can pass through a rice bran comminutor (36) to reduce or make the particles of an amount of bran (38) compatible with the bran fraction supercritical carbon dioxide extraction system (17).

While the above described embodiments of the invention provide specific examples relating to whole grain rice (31) and whole corn (2) and the corresponding corn bran fraction (4) and the rice bran fraction (34), the invention is not so limited and the bran extraction and bran extraction material fractionation processes described below can be used to produce bran extraction materials (19) and bran extraction material fractions (76)(86)(98) from an amount of bran (38) of a numerous and wide variety of grains including without limitation: rice, corn, wheat, oats, barley, millet, or the like. Hereinafter, the rice bran fraction (34), the corn bran fraction (4), or other grain bran fraction, will be collectively referred to as "an amount of bran (38)" where a step or element generally applies to any type of bran fraction and where a step or element specifically relates to a particular type or kind of bran such bran will be specifically referred to as an amount of bran (38) of a corn bran fraction (4) or of a rice bran fraction (34), or an amount of bran (38) of another grain bran fraction where there is a difference in a particular element or step.

Now referring primarily to FIGS. 3, 4 and 8, particular embodiments of the invention can include a bran fraction supercritical carbon dioxide extraction assembly (17) (the elements encompassed in broken line). A particular embodiment of the bran fraction supercritical carbon dioxide extraction system (17) can be configured to in part include a cascade extractor in which a plurality of extractor vessels (40) each define a bran extraction zone (41) (see for example FIG. 4) inside of which a comminuted amount of bran (38) can be located for fluidic engagement with an amount of supercritical carbon dioxide (42) for an extraction event which results in production of an amount of bran extraction material (19) in the amount of supercritical carbon dioxide (42). In a cascade extractor, each of the plurality of extractor vessels (40) can independently perform an extraction event as further described below on the comminuted amount of bran (38) located in each of the plurality of extractor vessels (40) in manner which allows at least one extractor vessel (40A) (shown in broken lines) to come off line after the extraction event in that one of the plurality of extractor vessels (40) for a duration of time sufficient to remove the amount of extracted bran cake (18) and introduce an amount of bran (38) for a subsequent extraction event. Each of the plurality of extractor vessels (40) can be coupled to a heat source (43) which generates an amount of heat (44) sufficient to maintain the amount of supercritical carbon dioxide (42) at a temperature (45) (see also FIG. 1) in the range of about 80° C. and about 130° C. during fluidic engagement with the amount of bran (38) located inside the a bran extraction zone (41). The bran fraction supercritical carbon dioxide extraction assembly (17) can further include a plurality of conduits and valves (46) configured to allow transfer of the amount of supercritical carbon dioxide (42) into and away from the bran extraction zone (41). While a particular example of a cascade extractor is shown in FIG. 3, it is not intended that this configuration of cascade extractor be limiting with respect to the numerous and varied configurations of cascade extractors which could be utilized or made compatible with the embodiments of the supercritical carbon dioxide extraction conditions (29) herein described such as a cascade extractor having two extractor vessels (40) or three extractor vessels (40), or alternately provides a continuous feed extractor which continuously introduces an amount of bran (38) into at least one extractor vessel (40) counter current to the continuous introduction of an amount of supercritical carbon dioxide (42), or alternately could provides a one or more batch extractor vessels (40) in which an amount of bran (38) can be extracted and then comes off-line to remove the bran cake (18), or otherwise configured to perform the extraction event under the conditions bounded by block E-1 as shown in FIG. 8 or as otherwise described herein.

Depending upon the exact configuration of the bran extraction zone (41), the dimensional configuration of the comminuted particles of the amount of bran (38), the pressure (47) of the amount of supercritical carbon dioxide (42) fluidcly engaged with the amount of bran (38), the ratio (48) of the amount of supercritical carbon dioxide (38) to the amount of bran (38) during the extraction event, and the period of time (49) in which the extraction event occurs, the temperature (45) can be adjusted within the range of about 80° C. and about 130° C. to maintain constant or maintain substantially constant or alter (whether continuously or intermittently adjust) the rate at which an amount of bran extraction material (19) can be transferred from the amount of bran (38). Accordingly, the temperature (45) can as to certain embodiments of the invention have a range selected from the group including: about 80° and about 130°, about 80° C. and about 125° C., about 80° C. and about 120° C., about 80° C. and about 115° C., about 80° C. and about 110° C., about 80° C. and about 105° C., about 80° C. and about 100° C., about 80° C. and about 95° C., about 80° C. and about 90° C., about 80° C. and about 85° C., about 85° C. and about 130° C., about 85° C. and about 125° C., about 85° C. and about 120° C., about 85° C. and about 115° C., about 85° C. and about 110° C., about 85° C. and about 105° C., about 85° C. and about 100° C., about 85° C. and about 95° C., about 85° C. and about 90° C., about 90° C. and about 130° C., about 90° C. and about 125° C., about 90° C. and about 120° C., about 90° C. and about 115° C., about 90° C. and about 110° C., about 80° C. and about 105° C., about 90° C. and about 100° C., about 90° C. and about 95° C. In certain particular embodiments of the invention as described by Examples 3 and 4 the temperature (45) is about 100 can be about 100° C.

As to certain embodiments of the invention, the heat source (43) can be coupled to a temperature adjustment element (51) which can monitor the temperature (45) of the amount of supercritical carbon dioxide (42) in the bran extraction zone (41) or can monitor other conditions outside of the bran fraction extraction zone (41) such as the amount of bran extraction material (19) in the amount of supercritical carbon dioxide (42) (also referred to as the "effluent" (52)) flowing from the bran extraction zone (41), or other measure of the efficiency of the extraction event. The temperature adjustment element (51) allows for the discontinuous, intermittent, or continuous adjustment of the temperature of the amount of supercritical carbon dioxide (42) in the bran extraction zone (41) to maintain a pre-selected temperature (53) (a substantially constant temperature within one of the above-described ranges), a pre-selected temperature profile (54) (the temperature adjusted during the extraction event to match one or more temperatures associated with one or more particular time point(s)), or a bran extraction effluent profile (55) (the temperature adjusted during the extraction event to match actual effluent conditions with a pre-selected effluent conditions) based on monitoring the effluent (52) from the bran extraction zone (41). As one non-limiting example, the temperature (45) can be adjusted at or within the range of temperatures above-described to achieve extraction of a pre-selected amount of bran extraction material (19) in a pre-selected amount of super critical carbon dioxide (42).

Particular embodiments of the bran fraction supercritical carbon dioxide extraction system (17) can further include a carbon dioxide recycle assembly (56) (the elements encompassed in broken line). The carbon dioxide recycle assembly (56) can include a condenser (57) which provides condensing conditions (58) to establish the an amount of carbon dioxide (59) in a phase compatible with a pressure generator (60) which establishes an amount of supercritical carbon dioxide (42) at a pressure (47) in the range of about 6,000 psi and about 12,000 psi in the bran extraction zone (41).

Depending upon the exact configuration of the bran extraction zone (41), the dimensional configuration of the comminuted particles of the amount of bran (38), the temperature (45) of the amount of supercritical carbon dioxide (42) fluidcly engaged with the amount of bran (38), the ratio (48) of the amount of supercritical carbon dioxide (42) to the amount of bran (38) during the extraction event, and the period of time (49) in which the extraction event occurs, the pressure (47) (adjusted to Sea Level) can be adjusted within the range of about 7,000 psi ("pounds per square inch") and about 15,000 psi (10 bar equals 1 MPa, 1 MPa equals about 145.04 psi at Sea Level) to maintain constant or maintain substantially constant or alter (whether continuously or intermittently adjust) the rate at which bran extraction material (19) can be transferred from the amount of bran (38). Accordingly, the pressure (47) can as to certain embodiments of the inventions can be selected from the group of ranges including: about 7,000 psi and about 14,000 psi, about 7,500 psi and about 14,000 psi, about 8,000 psi and about 14,000 psi, about 8,500 psi and about 14,000 psi, about 9,000 psi and about 14,000 psi, about 9.500 psi and about 14,000 psi, about 10,000 psi and about 14,000 psi, about 10,500 psi and about 14,000 psi, about 11,000 psi and about 14,000 psi, about 11,500 psi and about 14,000 psi, about 12,000 psi and about 14,000 psi, about 12,500 psi and about 14,000 psi, about 13,000 psi and about 14,000 psi; about 13,500 psi and about 14,000 psi; about 7,000 psi and about 13,500 psi, about 7,000 psi and about 13,000 psi, about 7,000 psi and about 12,500 psi, about 7,000 psi and about 12,500 psi, about 7,000 psi and about 12,000 psi, about 7,000 psi and about 11,500 psi, about 7,000 psi and about 11,000 psi, about 7,000 psi and about 10,500 psi, about 7,000 psi and about 10,000 psi, about 7,000 psi and about 9,500 psi, about 7,000 psi and about 9,000, about 7,000 psi and about 8,500, about 7,000 psi and about 8,000, about 7,000 psi and about 7,500. As shown in Examples 3 and 4 the extraction can be performed 690 bar (about 10,000 psi at Sea Level)

As to certain embodiments of the invention, the pressure generator (60) can be coupled to a pressure adjustment element (61) which can monitor pressure of the amount of supercritical carbon dioxide (42) in the bran extraction zone (41) or can monitor other conditions outside of the bran fraction extraction zone (41) such as the amount of bran extraction material (19) in the amount of supercritical carbon dioxide (42) (the "effluent" (52)) flowing from the bran extraction zone (41), or other measure of the efficiency of the extraction event. The pressure adjustment element (61) allows for the discontinuous or continuous adjustment of the pressure (47) of the amount of supercritical carbon dioxide (42) in the bran extraction zone (41) to maintain a pre-selected pressure (62) (a substantially constant pressure within one of the above-described ranges), a pre-selected pressure profile (63) (the pressure adjusted during the extraction event to match one or more pressures associated with a particular time point(s)), or a bran extraction effluent profile (64) (the pressure adjusted during the extraction event to match actual effluent conditions with a pre-selected effluent conditions) based on monitoring the effluent (52) from the bran extraction zone (41). As one non-limiting example, the pressure (47) can be adjusted within the range of pressures above-described to achieve extraction of a pre-selected amount of bran extraction material (38) in a pre-selected amount of super critical carbon dioxide (42).

Now referring primarily to FIG. 5 and Example 1, the example shows that fluidic engagement of an amount of supercritical carbon dioxide (42) at a substantially constant flow rate at a substantially constant pressure (62) of 9000 psi (at Sea Level) and at a substantially constant temperature (53) of 100 degrees centigrade ("° C.") with an amount of bran (38) in a bran extraction zone (41) extracts substantially all ("substantially all" for the purposes of this invention means greater than: about 83%, 83%, greater than 83%, about 85%, about 90% about 95%, about 97%, about 98%, about 99% of the bran extraction material (19) in the amount of bran (38) extracted) of the bran extraction material (19) in an amount of bran (38) over a period of time (49).

Now referring primarily to FIG. 6 and Example 2, separate extraction events are plotted to show weight of bran extraction material (19) produced as a percent of the weight of the amount of bran (38) extracted at certain solvent to feed ratios (48) (also referred to as "ratios") as grams of supercritical carbon dioxide (42) per gram of bran (38) extracted. As shown in FIG. 5, and described by Example 2 an amount of supercritical carbon dioxide (42) at a substantially constant pressure (62) of about 9000 psi and at a substantially constant temperature (53) of about 100° C. with a solvent to feed ratio (48) in the range of between about 6:1 weight to weight ("wt/wt") to 7:1 wt/wt can achieve extraction of substantially all of the bran extraction material (19) in the extracted amount of bran (38).

It is not intended that the solvent to feed ratio (48) in the range of 6:1 (wt/wt) to 7:1 (wt/wt) limit the invention to this particular range of solvent to feed ratios (48). Rather, a wide range of solvent to feed ratios (48) can be useful in the extraction of bran extraction material (19) as shown by the examples shown in FIG. 6 and depending upon the application in accordance with a particular embodiment of the invention a ratio (48) in the range of about 2:1 (wt/wt) to about 10:1 (wt/wt) can be used to extract bran extraction material (19) from an amount of bran (38). Accordingly, certain embodiments of the invention can utilize other ranges of solvent to feed ratios (48) selected from the group including: about 2:1 (wt/wt) to about 10:1 (wt/wt), about 2:1 (wt/wt) to about 9:1 (wt/wt), about 2:1 (wt/wt) to about 8:1 (wt/wt), about 2:1 (wt/wt) to about 7:1 (wt/wt), about 2:1 (wt/wt) to about 6:1 (wt/wt), about 2:1 (wt/wt) to about 5:1 (wt/wt), about 2:1 (wt/wt) to about 4:1 (wt/wt), and about 2:1 (wt/wt) to about 3:1 (wt/wt). Example 3 and Example 4 set out below utilize a solvent to feed ratio (48) of about 10:1 (wt/wt). Altering the solvent to feed ratio can be useful in generating a ban cake (18) retaining a pre-determined amount of bran extraction material (19) to be burned to generate a pre-determined amount of heat in certain embodiments of the invention above-described.

Now referring to FIG. 4 and Examples 1, 3 and 4, it can be understood that by adjusting the solvent to feed ratio (48) the extraction event can also be performed in a lesser duration period of time (49). As shown by FIG. 4 and Example 1, the use of a solvent to feed ratio (48) in the range of about 6:1 (wt/wt) to about 7:1 (wt/wt) with the amount of supercritical carbon dioxide (42) at a substantially constant pressure (62) of 9,000 psi and at a substantially constant temperature (53) of about 100° C. substantially all of the bran extraction material (19) can be extracted in a period of time (49) of about 60 minutes. As shown by FIG. 4, and Examples 3 and 4, the use of a solvent to feed ratio (48) of about 10:1 (wt/wt) with the amount of supercritical carbon dioxide at a substantially constant pressure (62) of 9,000 psi and at a substantially constant temperature (53) of about 100° C. can extract substantially all of the bran extraction material (19) in a period of time (49) of about 30 minutes. The period of time (49) in which the extraction event occurs in accordance with the above description can as to certain embodiments be adjusted in a range of about ten minutes and sixty minutes, and as to other embodiments adjusted in a range of about ten minutes to about thirty minutes or selected from the group including: about 10 minutes to about 30 minutes, about ten minutes to about 25 minutes, about ten minutes to about 20 minutes, about ten minutes to about 15 minutes, or about 10 minutes.

Additionally, Examples 3 and 4 evidence that extraction events in accordance with the invention above described can be utilized with an amount of bran (38) which contains a lesser amount of bran extraction material (19) such as corn bran fraction (4) which contains about 1.5% to about 5% bran extraction material (19) (wt/wt) and with an amount of bran (38) which contains a greater amount of bran extraction material (19) such as rice bran fraction (34) which contains about 15% to about 20% bran extraction material (19) (wt/wt).

The term "bran extraction material (19)" for the purposes of this invention means the materials extracted from an amount of bran (38), and specifically from a corn bran fraction (4) or rice bran fraction (34), by use of one or more of the methods above-described or by other devices or methods (for example without limitation solvent extraction, hydraulic pressing, expeller pressing, or the like), including in various combinations and amounts: neutral extraction oils, oryzanol, ferulate-phytosterol esters ("FPE's"), free fatty acids (FFA) from the degradation of bran oils by hydrolysis, phosphatids (hydratable and non-hydratable), organic compounds which contribute certain colors, flavors or odors, particulates entrained by the bran extraction material (19), or the like.

Now referring primarily to FIGS. 3, 4, and 7, the effluent (52) exiting the plurality of extractor vessels (40) passes to a bran extraction material fractionation assembly (50) in which the effluent (52) passes serially through each of one or more separator vessels such as the embodiment of the invention shown in FIG. 7 which provides a first separator vessel (72), a second separator vessel (82), and the third separator vessel (93) each configured to establish conditions in the respective bran separation zones (73)(84)(95) which allow adjustable pressure of the effluent (52) of between about 200 bar to about 400 bar, about 150 bar and about 300 bar, and about 75 bar to about 100 bar respectively at temperatures respectively fixed at a temperature in the range of about 60° C. to about 110° C., about 60° C. to about 100° C. and about 40° C. to about 70° C. While FIG. 7 shows an embodiment of a bran extraction material fractionation assembly (50) which provides three separator vessels, the invention is not so limited, and embodiments of the invention can provide a single separator vessel, a pair of separator vessels, or a plurality of separator vessels at least one of which operates in the range of conditions bounded by block S-1 as shown FIG. 8 to provide a pressure in the range of about 200 bar and 400 bar and a temperature in the range of about 60° C. to about 110° C. to enrich the amount of FPE (102) or oryzanol (78) in the collected fraction.

Operation of a main pressure reduction generator (67) coupled to conduit (68), in part controls the pressure in the bran extraction material separation zones (73)(84)(93) at the same time the conduit valve (69) controls the flow of effluent (52) to the separator vessels (72)(84)(93). The auxiliary pressure reduction generators (80)(83)(94) downstream of each separator vessel (72)(82)(93) and heat exchangers (70)(81)(92) upstream of each separator vessel (72)(82)(93) operate to control the conditions in each such separator vessel (72)(82)(93) to obtain separated bran extraction material fractions (76)(86)(98) from the effluent (52). The effluent (52) flows by operation of the main pressure reduction generator (67) in conduit (68) through the first heat exchanger (70) in conduit (71) and into the first separator vessel (72).

Now referring primarily to FIGS. 3 and 7, the effluent (52) entering the first bran material separation zone(s) (73) of the first separator vessel (72) (or plurality of first separator vessels depending upon the embodiment) can be maintained at a first separator vessel temperature (74) in the range of about 60° C. to about 110° C. and a first separator vessel pressure (75) of the effluent (52) can be variably adjusted between about 200 bar and about 400 bar to achieve a density of the effluent (52) of between about 0.5 g/mL and about 0.9 g/mL to produce first fraction (76) (also referred to as an oryzanol fraction or FPE fraction) (see conditions bounded by block S-1 in FIG. 8). The first fraction (76) which separates out of the effluent (52) in the first separator vessel (72) (or a plurality of separator vessels operated in the range of the above-described conditions whether the same or different in each separator vessel) can be periodically removed or exits through the first separator vessel drain line (77). The first fraction (76) can contain oryzanol (78) from fractionation of rice bran extraction materials or FPE's (102) from the fractionation of corn bran extraction materials (78) in a range of about ten percent to about twenty percent by weight. This first fraction (76) can provide about a ten fold increase of the amount of FPE's (102) or oryzonol (78) typically found in the unseparated bran extraction material (19) which can be about one and one-half percent (1.5%).

Now referring primarily to FIG. 7 and Examples 3 and 4, an increase in the total amount of the FPE's (102) or oryzonol (78) in the first fraction (76) can be achieved by fixing the first separator vessel temperature (74) within a narrower temperature range of between about 95° C. and about 105° C. and adjusting first separator vessel pressure (75) between about 300 bar and about 350 bar to achieve a density of the supercritical carbon dioxide of between about 0.7 g/mL and about 0.8 g/mL.

Now referring specifically to Example 3, the first fraction (76) of a bran extraction material (19) of a corn bran fraction (4) can be obtained with a first separator vessel temperature (74) of about 100° C. and adjusting the first separator vessel pressure (75) to about 350 bar to achieve a density of the supercritical carbon dioxide (42) in the effluent (52) of about 0.7 g/mL. The first fraction (76) of the bran extraction material (19) of a corn bran fraction (4) can be about 10% by weight of the total extracted bran extraction material (19). The concentration of FPE (102) in the first fraction (76) can about 15% by weight or a 10 fold increase in concentration as compared with the bran extraction material (19) extracted from the amount of bran (19) of the corn bran fraction (4) which contains about one and one-half percent (1.5%) by weight.

Now referring specifically to Example 4, the first fraction (76) of a bran extraction material (19) of a rice bran fraction (34) established in an amount of supercritical carbon dioxide (42) can be achieved at first separator vessel temperature (74) of about 100° C. and adjusting the first separator vessel pressure (75) to about 350 bar to achieve a density of the supercritical carbon dioxide in the effluent (52) of about 0.7 g/mL Again, the first fraction (76) of the bran extraction material (19) of a rice bran fraction (34) can be about 10% by weight of the total extracted bran extraction material (19). The concentration of oryzanol (78) in the first fraction (76) can about 15% by weight or a 10 fold increase in concentration as compared with the concentration of oryzanol (79) in the bran extraction material (19) of the rice bran fraction (4) of about one and one-half percent (1.5%).

Again referring primarily to FIGS. 3 and 7, the resulting effluent (52) can proceed from the first separator vessel (72) through the conduit (79) by operation of a first auxiliary pressure reduction generator (80) and through a second heat exchanger (81) into the second separator vessel (82). The temperature of the effluent (52) can be adjusted in the second heat exchanger (81), and the pressure in the second separator vessel (82) can be adjusted by the second downstream pressure reduction generator (83). Separation conditions in the second bran extraction material separation zone (84) of the second separator vessel (82) can be established to provide a second separator temperature (85) in the range of about 60° C. to about 100° C. and a second separator pressure (89) adjusted within range of about 150 bar to about 300 bar to achieve a density of the supercritical carbon dioxide (42) in the effluent (52) of between about 0.35 g/mL and about 0.85 g/mL to produce a second fraction (86) (see conditions bounded by block S-2 in FIG. 8) which can, if desired, be essentially free (containing less than about 0.1% by weight) of FPE (102) or oryzanol (78). The second fraction (86) which separates out of the effluent (52) in the second separator vessel (82) exits through the second separator vessel drain line (87). This second fraction (86) can be predominantly glyceride in which the glycerol is esterified with fatty acids.

Now referring primarily to FIG. 7 and Table 1, conditions can be established in the second bran extraction material separation zone (84) which allows the separation of the second fraction (86) while free fatty acids (88) ("FFAs") remain soluble in the effluent (52). Specifically in the non-limiting context of a bran extraction material (19) of the corn bran fraction (4) having the first fraction (76) removed, the second fraction (86) can be separated while the FFAs (88) remain soluble in the effluent (52) by fixing the second separator temperature (85) within a range of between about 70° C. and about 90° C. and adjusting second separator pressure (89) of the effluent (52) between about 150 bar and about 300 bar to achieve a density of the supercritical fluid of between about 0.3 g/mL and about 0.8 g/mL.

Now referring primarily to FIG. 7 and Example 4, specifically in the non-limiting context of an amount of bran extraction material (19) of the rice bran fraction (34) established in an amount of supercritical carbon dioxide (42), an even greater increase in free fatty acid (88) in the effluent (52) transferred from the second bran extraction material separation zone (84) can be achieved within a fixed range of temperature of between about 70° C. and about 90° C. and adjusting pressure of the effluent (52) between about 150 bar and about 300 bar to achieve a density of the supercritical carbon dioxide of between about 0.3 g/mL and about 0.8 g/mL. As to certain embodiments of the invention, even a greater amount of FFAs (88) remain soluble in the effluent (52) at a fixed temperature of about 60° C. and adjusting the pressure to about 0.72 g/mL.

TABLE 1

$2^{nd}$ Separator Data

| Experiment # | Pressure MPa | Temp. ° C. | $CO_2$ Density g/mL | Free Fatty Acid in Effluent mg/g |
|---|---|---|---|---|
| Feedstock | N/A | N/A | | 1.74 |
| SM 70613-1 | 19.926 | 60 | 0.722 | 18.82 |
| SM 70614-1 | 25.028 | 65 | 0.762 | 16.26 |
| SM 70615-1 | 20.684 | 55 | 0.764 | 10.99 |
| SM 70618-1 | 19.995 | 45 | 0.813 | 9.63 |
| SM 70618-2 | 23.994 | 75 | 0.698 | 11.70 |
| SM 70619-1 | 17.995 | 45 | 0.789 | 11.58 |

MPa = Megapascals
1 Megapascal = 10 bar

Again referring to Table 1, crude corn oil feedstock was obtained from ConAgra Foods Inc., Memphis, Tenn. with a free fatty acid concentration of 1.74 mg/g. 500 ml of crude corn oil feedstock was fed through the second separator (82) by a high pressure diaphragm pump to enable the countercurrent contact between the feedstock and supercritical carbon dioxide. The temperature in the separator column was set at 60° C. in all the sections. The supercritical carbon dioxide (42) supply pressure was 19.926 MPa. This temperature and pressure represented a pure carbon dioxide density of 0.722 g/mL. The feedstock was fed into the column at an average of rate of approximately 2.6 mL/min; the carbon dioxide flow rate was kept at 3 SLPM. Every ten minutes, readings were taken of the pressure inside the column, at the $CO_2$ pump and the diaphragm feedstock pump, also the temperatures at the top, center, and bottom of the fractionation column were monitored. Finally the temperatures of the supercritical $CO_2$ entering and exiting the column were also recorded. The second separator was operated in the manner described above for 120 minutes. After reaching steady-state of pressures, temperatures and flow rates within the column a sample was obtained of the effluent exiting the second separator under steady-state operating conditions and analyzed for FFA composition. The FFA (84) concentration was folded by fractionation at these processing conditions by a factor of about 10.82 from 1.74 mg/g to 18.82 mg/g (see Table 1, SM 70613-1). Fractionation continued utilizing the same procedure at processing conditions representing both higher and lower pure carbon dioxide densities as shown in Table 1. As can be seen from the table the FFA (84) concentrations begin to selectively concentrate approaching 19% in the third separator below a pure carbon dioxide density of about 725 kg/m³.

Now referring primarily to FIGS. 3 and 7, the resulting effluent (52) proceeds from the second separator vessel (82) through the conduit (90), by operation of the third auxiliary pressure reduction generator (94) and through the third heat exchanger (92) into the third separator vessel (93). The temperature of the effluent (52) can be adjusted in the third heat exchanger (92), and the pressure of the fluid in the third separator vessel (93) can be adjusted by the third downstream pressure reduction generator (94). Fractionation conditions in the third bran extraction material separation zone (95) of the third separator vessel (93) establish a third separator temperature (96) in the range of about 40° C. to about 70° C. and the a third separator pressure (97) can be adjusted within the range of about 75 bar to about 100 bar to achieve a density of the supercritical carbon dioxide (42) of between about 0.1 g/mL and about 0.6 g/mL which allows separation of the FFA fraction (98) from the effluent (52) (see conditions bounded by block S-3 in FIG. 8). The FFA fraction (98) which separates out of the effluent (52) in the third separator vessel (93) exits through the third separator vessel drain line (99). This FFA fraction (98) comprises a carboxylic acid often with a long unbranched aliphatic tail (chain), which is either saturated or unsaturated. Carboxylic acids as short as butyric acid (4 carbon atoms) are considered to be fatty acids, while fatty acids derived from natural fats and oils may be assumed to have at least 8 carbon atoms, such as caprylic acid (octanoic acid). In regard to biodiesel production, if the free fatty acid level is too high it may cause problems with soap formation and the separation of the glycerin by-product downstream. It is also known that high free fatty acids levels may not be good for human health.

Now referring primarily to FIG. 8, in increase in total amount of free fatty acids (88) in the FFA fraction (98) can be achieved by fixing the temperature within a narrower temperature range of between about 45° C. and about 65° C. and adjusting pressure of the effluent (52) between about 85 bar and about 95 bar to achieve a density of the supercritical fluid of between about 0.1 g/mL and about 0.3 g/mL.

Specifically in the non-limiting context of an amount of bran extraction material (19) of an amount of corn bran fraction (4) established in an amount of supercritical carbon dioxide (42), an even greater increase in FFAs (88) can be achieved within a fixed range of temperature of between about 50° C. and about 60° C. and adjusting pressure of the effluent (52) between about 80 bar and about 90 bar to achieve a density of the supercritical carbon dioxide of between about 0.1 g/mL and about 0.3 g/mL.

Now referring primarily to FIG. 3, the resulting amount of carbon dioxide (100) proceeds from the third separator vessel (93) through the conduit (101) under the influence of the third auxiliary pressure reduction generator (94) to the carbon dioxide recycle assembly (56) which further include the condenser (57) which provides condensing conditions (58) to establish the amount of carbon dioxide (100) in a phase compatible with a pressure generator (60) which establishes and maintains the amount of supercritical carbon dioxide (42) at pressures between about 7,000 psi and about 14,000 psi in the bran extraction zone (41). The pressure generator (60) can be coupled to a pressure adjustment element (61) which can monitor the pressure of the amount supercritical carbon dioxide (42) in the bran extraction zone (41) or can monitor other conditions outside of the bran extraction zone (41) such as the amount of bran extraction material (19) in the effluent (52), or other measure of the efficiency of the extraction event to allow continuous adjustment of the pressure of the amount of supercritical carbon dioxide (42) in the bran extraction zone (41) to establish or maintain a preselected pressure (62), a preselected pressure profile (63), or a preselected bran extraction efficiency profile (64) based on monitoring the effluent (52) from the bran extraction zone (4a).

Now again referring primarily to FIG. 1, it can be understood that if the flow rate of the supercritical carbon dioxide (42) in the bran extraction zone (41) has a constant velocity (although in practice the velocity can also be varied) then the effects of the alteration of the supercritical carbon dioxide extraction conditions (13) as to a temperature (45) and a pressure (47) can be evaluated as to effect on a ratio (48) of the amount of supercritical carbon dioxide (42) at a pre-selected temperature (53) and a pre-selected pressure (62) to the amount of bran (38) (wt./wt.) (also referred to as the "solvent to feed ratio") to reach a particular extraction event end point such as an amount of bran extraction material (19) of about 1.5% to about 3% of the amount of the corn bran fraction (4) (wt./wt.) or about 10% to about 20% of the amount of the rice bran fraction (34). For example, if the solvent to feed ratio is about 20 to 1 to obtain an amount of bran extraction material (19) then for each ton of bran extraction material (19) extracted about twenty tons of supercritical carbon dioxide (42) would be utilized. If the solvent to feed ration is about 2 to 1, then for each ton of an amount of bran extraction material (19) extracted two tons of supercritical carbon dioxide (42) would be utilized, and so forth. If the a bran fraction supercritical carbon dioxide extraction system (17) processes 300 tons of bran (38) per day at a solvent to feed ratio of about 20 to 1 then about 6,000 tons of supercritical carbon dioxide (42) would pass through the bran extraction zone (41) of the a bran extractor assembly (39) and be recovered by the carbon dioxide recycle assembly (56) per day. However, if the a bran fraction supercritical carbon dioxide extraction system (17) processes the same 300 tons of bran (38) per day at a solvent to feed ratio (48) of about 2 to 1 then only 600 tons of supercritical carbon dioxide (42) would pass through the bran extraction zone (41) of the bran extractor assembly (39) and be recovered by the carbon dioxide recycle assembly (45) per day. Accordingly, the bran extractor assembly (39) can be configured to allow for processing of the corresponding amount of effluent (52) which may result in a substantial cost savings.

For the purposes of the present invention, ranges may be expressed herein as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Additionally, for the purposes of the present invention, the term "a" or "an" entity refers to one or more of that entity; for example, "a separation vessel" refers to one or more of those elements. As such, the terms "a" or "an", "one or more" and "at least one" or "a plurality" can be used interchangeably herein.

EXAMPLE 1

74.03 g of corn bran was ground and sieved, and placed in a 500 ml extraction vessel and extracted with pure carbon dioxide for 140 minutes at a pressure of 9000 psi and a temperature of 90° C. The flow rate was 4-5 liters supercritical carbon dioxide/minute. A total of 1.24 g of extraction material was extracted (1.35% by weight of feedstock).

EXAMPLE 2

74.03 g of corn bran was ground and sieved, and placed in a 500 ml extraction vessel and extracted with pure carbon dioxide for 140 minutes at a pressure of 9000 psi and a temperature of 90° C. The flow rate was 4-5 liters supercritical carbon dioxide/minute. The effluent was sampled at supercritical carbon dioxide to feed ratios (grams of supercritical carbon dioxide to grams of feedstock of about 1.0; 1.0, 2.0:1.0, 3.0:1.0, 4.0:1.0, 5.0:1.0, 6.0:1.0, and about 7.0:1.0.

EXAMPLE 3

100 g of corn bran obtained from Semo Milling, LLC, 401 Ferry Street, Suite 104, Metropolis, Ill. 62960 is extracted utilizing supercritical carbon dioxide at a solvent to feed ratio of 10:1 and at a pressure of 680 bar and 100 degrees Celsius. An extract is obtained at a yield of 3% corn bran oil. This corn bran oil has a ferulate-phytosterol ester concentration of 1.5%. The extracted solute is next sent through a series of high performance separators. In the first separator set at a pressure of 350 bar and a temperature of 100° C., a fraction is created that is about 10% by weight of the total extraction. This fraction includes free fatty acids, free sterols, triglycerides, diglycerides, and ferulate-phytosterol esters. The concentration of the ferulate-phytosterol esters is about 15% by weight. The second and third separators contain 90% by weight of the extract composed of fatty acid-phytosterol esters and triglycerides. The concentration of ferulate-phytosterol esters is less than 0.1%.

EXAMPLE 4

100 g of rice bran obtained from Semo Milling is extracted utilizing supercritical carbon dioxide at a solvent to feed ratio of 10:1 and at a pressure of 680 bar and 100 degrees Celsius. An extract is obtained at a yield of 18% rice bran oil. This rice bran oil has a ferulate-phytosterol ester concentration of 1.5%. The extracted solute is next sent through a series of high performance separators. In the first separator set within a pressure 350 bar and a temperature range of 100° C., a fraction was created that was 10% by weight of the total extraction. This fraction includes free fatty acids, free sterols, triglycerides, diglycerides, and ferulate-phytosterol esters. The concentration of the ferulate-phytosterol esters is about 15% by weight. The second and third separators contain 90% by weight of the extract composed of fatty acid-phytosterol esters and triglycerides. The concentration of ferulate-phytosterol esters is less than 0.1%.

As can be easily understood from the foregoing, the basic concepts of the present invention may be embodied in a variety of ways. The invention involves numerous and varied embodiments of a bran fraction extraction system and methods of making and using such bran fraction extraction system.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "extractor" should be understood to encompass disclosure of the act of "extracting"—whether explicitly discussed or not—and, conversely, were there effectively disclosure of the act of "extracting", such a disclosure should be understood to encompass disclosure of an "extractor" and even a "means for extracting." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the bran fraction extraction and fractionation systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below, if any, are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method of processing an amount of bran, comprising the steps of:
   providing an amount of bran;
   fluidicly engaging an amount of supercritical carbon dioxide with said amount of bran in a bran extraction zone, wherein said amount of supercritical carbon dioxide has a temperature in a range of about 85° C. and about 130° C., and wherein said amount of supercritical carbon dioxide has a pressure in a range of about 7,000 psi to about 14,000 psi;
   extracting an amount of bran extraction material from said amount of bran into said amount of supercritical carbon dioxide having said temperature in said range of about 85° C. and about 130° C. and said pressure in said range of about 7,000 psi to about 14,000 psi;
   transferring said amount of supercritical carbon dioxide containing said amount of bran extraction material to a first bran extraction material separation zone having a temperature in the range of about 60° C. and about 110° C. and a pressure in the range of about 2900 psi to about 5800 psi to achieve a density of said supercritical carbon dioxide of about 0.5 g/mL to about 0.9 g/mL; and
   separating a first fraction from said amount supercritical carbon dioxide containing said amount of bran extraction material, said first fraction being an oryzanol fraction which leaves remaining constituents of said bran extraction material contained in said amount of supercritical carbon dioxide.

2. The method of processing an amount of bran as described in claim 1, further comprising the step of establishing a ratio of said supercritical carbon dioxide fluidicly engaged with said amount of said amount of bran in said bran extraction zone having a range of about 2:1 (wt/wt) to about 10:1 (wt/wt).

3. The method of processing an amount of bran as described in claim 2, wherein said ratio is selected from the group consisting of: about 10:1 (wt/wt), about 9:1 (wt/wt), about 8:1 (wt/wt), about 7:1 (wt/wt), about 6:1 (wt/wt), about 5:1 (wt/wt), about 4:1 (wt/wt), and about 3:1 (wt/wt).

4. The method of processing an amount of bran as described in claim 2, further comprising the step of establishing a period of time having a range of about ten minutes and about 30 minutes in which said amount of supercritical carbon dioxide having said ratio in said range of about 2:1 (wt/wt) to about 10:1 (wt/wt) fluidicly engages said amount of bran inside said extraction zone.

5. The method of processing an amount of bran as described in claim 4, wherein said period of time is selected from the group consisting of: about 30 minutes, about 25 minutes, about 20 minutes, about 15 minutes, about 10 minutes.

6. The method of processing an amount of bran as described in claim 4, further comprising the step of providing a heat source which generates an amount of heat sufficient to maintain said amount of supercritical carbon dioxide at a temperature in said range of about 85° C. to about 130° C. during fluidic engagement with said amount of bran located inside said bran extraction zone.

7. The method of processing an amount of bran as described in claim 6, further comprising the step of providing a pressure generator coupled to said amount of supercritical carbon dioxide which maintains said amount of supercritical carbon dioxide at said pressure in said range of about 7,000 psi to about 14,000 psi during fluidic engagement with said amount of bran located inside said bran extraction zone.

8. The method of processing an amount of bran as described in claim 7, further comprising the steps of:
   adjusting said temperature of said heat source to maintain said temperature in said range of about 85° C. to about 130° C. during fluidic engagement with said amount of bran located inside said bran extraction zone; and
   adjusting said pressure of said pressure generator to maintain said pressure in said range of 7,000 psi to about 14,000 psi during fluidic engagement with said amount of bran located inside said bran extraction zone.

9. The method of processing an amount of bran as described in claim 8, further comprising the step of adjusting said amount of supercritical carbon dioxide fluidicly engaged to said amount of bran inside said extraction zone to establish said ratio in said range of about 2:1 to about 10:1 (wt/wt) to extract said amount of bran extraction material in a period of time in a range of about ten minutes to about 30 minutes.

10. The method of processing an amount of bran as described in claim 4, wherein said step of providing an amount of bran comprises the step of providing an amount of rice bran.

11. The method of processing an amount of bran as described in claim 4, wherein said step of providing an amount of bran comprises the step of providing an amount of corn bran.

12. The method of processing an amount of bran as described in claim 1, wherein said temperature of said amount of supercritical carbon dioxide fluidicly engaged with said amount of bran is selected from the group consisting of: about 130° C., about 125° C., about 120° C., about 115° C., about 110° C., about 105° C., about 100° C., about 95° C., about 90° C., and about 85° C.

13. The method of processing an amount of bran as described in claim 1, wherein said pressure of amount of supercritical carbon dioxide fluidicly engaged with said amount of bran is selected from the group consisting of: about 7,000 psi, about 7,500 psi, about 8,000 psi, about 8,500 psi, about 9,000 psi, about 9,500 psi, about 10,000 psi, about 10,500, about 11,000 psi, about 11,500 psi, about 12,000 psi, about 12,500 psi, about 13,000 psi; about 13,500 psi, and about 14,000 psi.

14. The method of processing an amount of bran as described in claim 1, further comprising the step of adjusting said density of said supercritical carbon dioxide within said range of about 0.5 g/mL to about 0.9 g/mL to generate in said first fraction an amount of oryzanol of about 90% to about 100% of a total amount of oryzanol in said bran extraction material in said amount of supercritical carbon dioxide.

15. The method of processing an amount of bran as described in claim 14, further comprising the step of adjusting said density of said supercritical carbon dioxide within said range of about 0.5 g/mL to about 0.9 g/mL to generate an amount of oryzanol in said first fraction of about 90% to about 100% of a total amount of oryzanol in said bran extraction material in said amount of supercritical carbon dioxide in an amount of triglycerides in a range of about 10% (wt/wt) to about 15% (wt/wt).

16. The method of processing an amount of bran as described in claim 15, further comprising the step of establishing a second bran extraction material separation zone which receives said bran extraction material in said amount of supercritical carbon dioxide having said first fraction separated in said first bran extraction material separation zone.

17. The method of processing an amount of bran as described in claim 16, further comprising the step of establishing said second bran extraction material separation zone at a temperature in the range of about 60° C. and about 100° C. and a pressure in the range of about 2175 psi to about 4350 psi to achieve a density of said supercritical carbon dioxide of about 0.3 g/mL to about 0.8 g/mL to separate a triglyceride fraction from said amount bran extraction material in said amount of supercritical carbon dioxide.

18. The method of processing an amount of bran as described in claim 17, further comprising the step of establishing a third bran extraction material separation zone which receives said bran extraction material in said amount of supercritical carbon dioxide having said first fraction separated in said first bran extraction material separation zone and said second fraction separated in said second bran extraction material separation zone.

19. The method of processing an amount of bran as described in claim 18, further comprising the step of establishing said third bran extraction material separation zone at a temperature in the range of about 40° C. to about 70° C. and a pressure in the range of about 1085 psi to about 1450 psi to achieve a density of said supercritical carbon dioxide of about 0.10 g/mL to about 0.30 g/mL to separate a free fatty acid fraction from said amount bran oil in said amount of supercritical carbon dioxide.

20. The method of processing an amount of bran as described in claim 19, further comprising the step of providing a carbon dioxide recycle assembly which receives said amount of supercritical carbon dioxide from said third bran oil separation zone, and wherein said carbon dioxide recycle assembly condenses said amount of super critical carbon for delivery to said bran extraction zone.

* * * * *